United States Patent
Meal et al.

[15] 3,662,453
[45] May 16, 1972

[54] METHOD OF AND APPARATUS FOR STRIPPING HEAT SHRINKABLE MATERIAL FROM A RELATIVELY RIGID ARTICLE

[72] Inventors: John R. Meal, Naperville; Gregory H. Smith, Wheaton, both of Ill.

[73] Assignee: Western Electric Company Incorporated, New York, N.Y.

[22] Filed: Apr. 21, 1970

[21] Appl. No.: 30,474

[52] U.S. Cl. ............................29/427, 29/200 D, 81/9.51, 156/344, 156/584, 225/2, 225/96.5
[51] Int. Cl. ........................................................B23p 19/02
[58] Field of Search..................29/426, 427, 200 D; 81/9.51; 225/96.5, 96, 2; 156/344, 584

[56] References Cited

UNITED STATES PATENTS

| | | | |
|---|---|---|---|
| 1,349,752 | 8/1920 | Erb | 156/584 |
| 2,636,408 | 4/1953 | Mitchell | 156/344 X |
| 2,722,145 | 11/1955 | Schulenburg | 225/96 X |
| 2,951,403 | 9/1960 | Bunch et al. | 81/9.51 |
| 3,364,801 | 1/1968 | Johnston | 81/9.51 |
| 3,448,509 | 6/1969 | O'Reilly | 29/403 |
| 3,462,052 | 8/1969 | Wagner | 225/2 |
| 3,474,517 | 10/1969 | Menne | 29/427 |
| 3,486,216 | 12/1969 | Cimolino | 225/2 X |

*Primary Examiner*—Charlie T. Moon
*Attorney*—H. J. Winegar, R. P. Miller and A. C. Schwarz

[57] ABSTRACT

In stripping heat shrinkable sheathing material from an elongated metallic article, the material is scored along the length of the article. The article next is positioned in a nest defined by a pair of juxtaposed rollers and the material is heated so that it shrinks and separates along its scored portion. The rollers then are rotated to strip the material from the article and to discharge the material from the nest through the rollers, after which the stripped article is removed from the nest.

6 Claims, 8 Drawing Figures

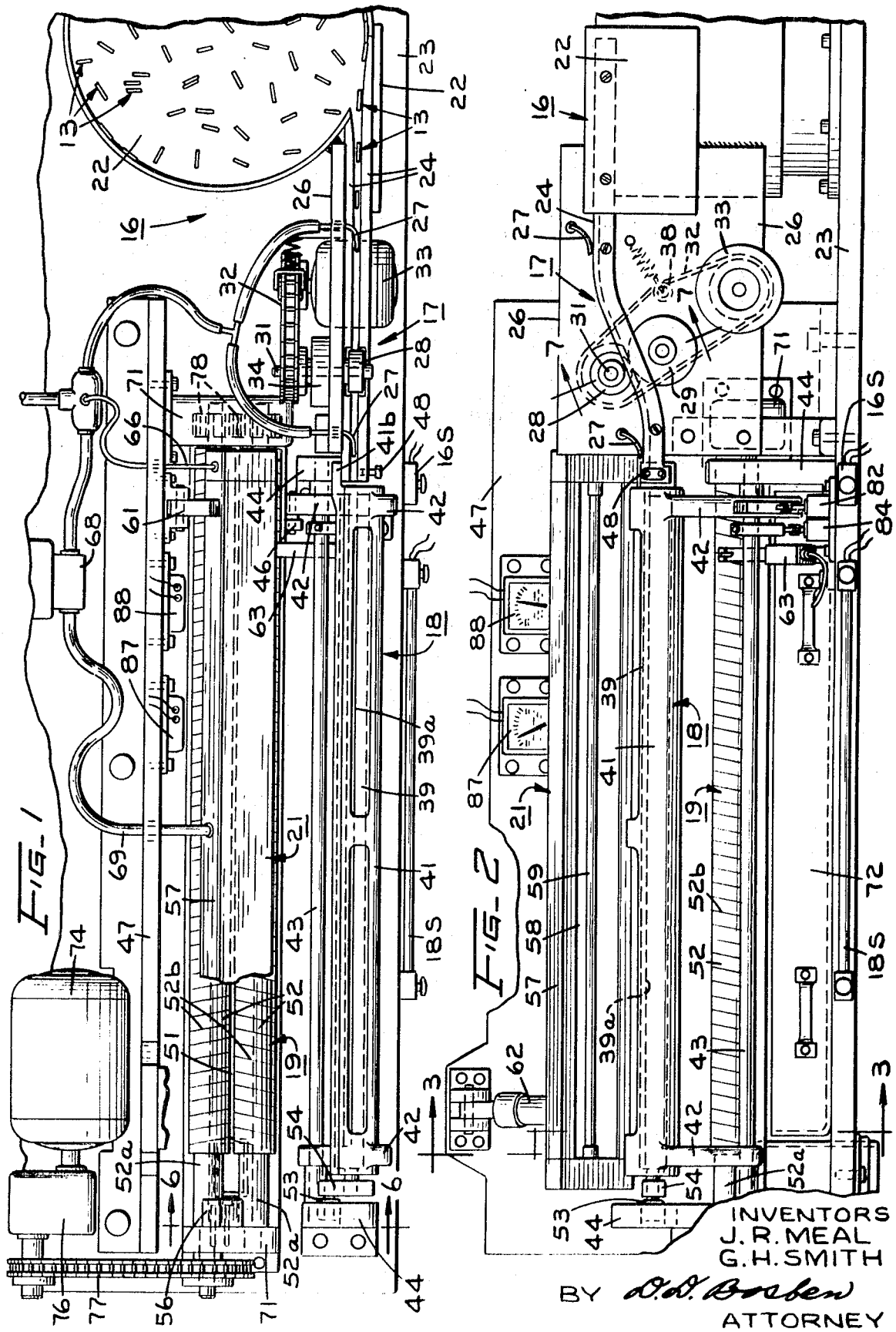

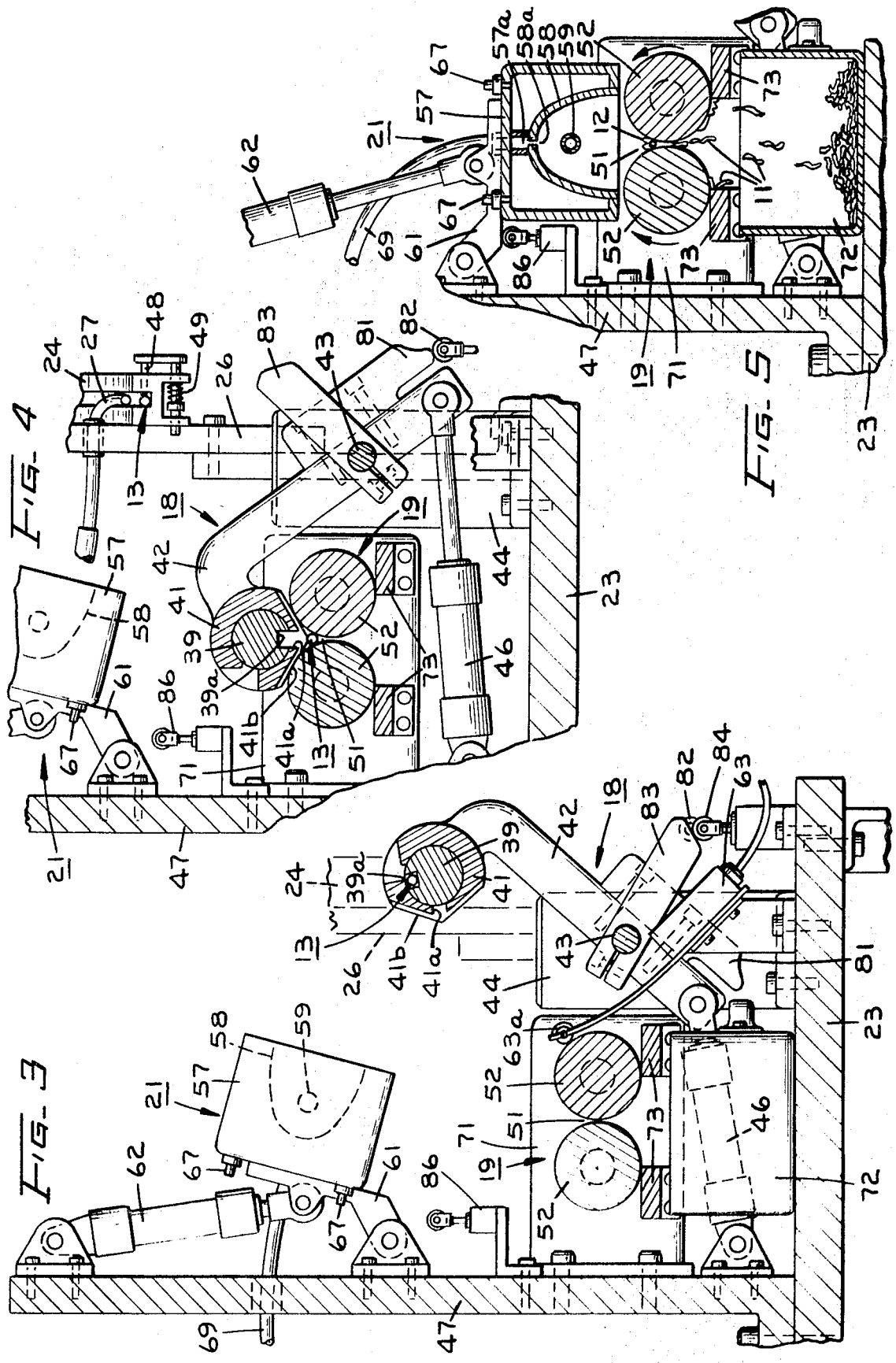

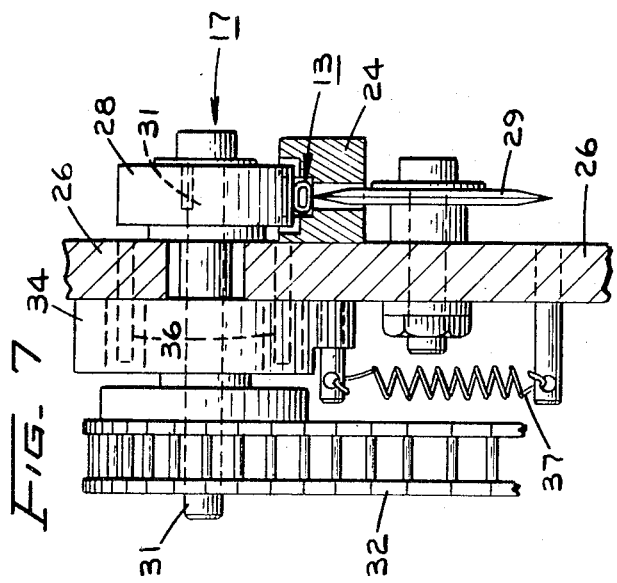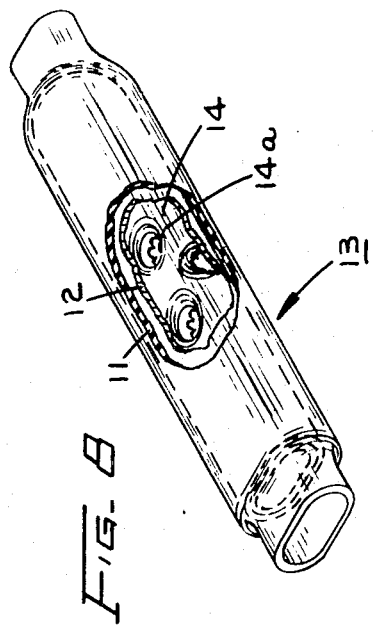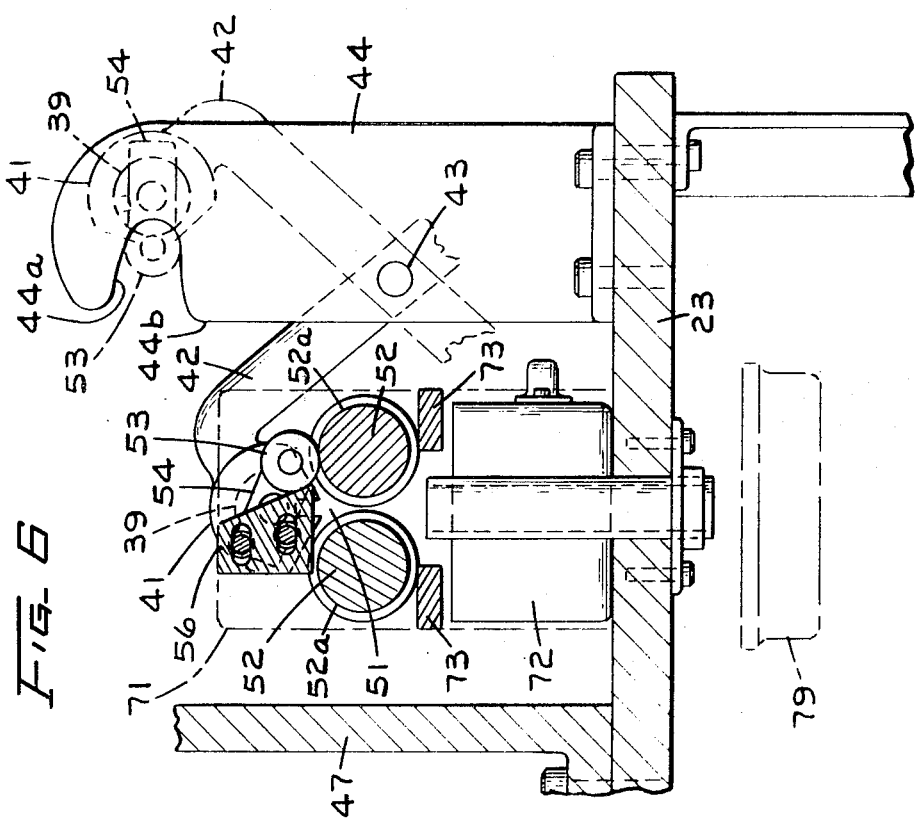

METHOD OF AND APPARATUS FOR STRIPPING HEAT SHRINKABLE MATERIAL FROM A RELATIVELY RIGID ARTICLE

BACKGROUND OF THE INVENTION

1. Field of the Invention

This invention relates to a method of and apparatus for stripping heat shrinkable material from a relatively rigid article, and more particularly to a method of and apparatus for stripping heat shrinkable plastic insulation from a metallic electrical connector.

2. Description of the Prior Art

In the manufacture of a sheathed electrical connector for connecting the ends of two electrical conductor wires together, a tubular metal insert having inwardly directed prongs for piercing the insulation on the wires and establishing an electrical connection therewith, is fixedly secured within an elongated metal shell. The metal shell then is received in a dielectric sleeve of a material which is preconditioned to shrink transversely of its length in response to the application of heat thereto, and the sleeved connector is subjected to heat so that the sleeve shrinks into tight engagement with the shell and forms a protective insulating sheath for the connector.

While the majority of the sheathed connectors produced in this manner are of good quality, some of them may have sheaths which are defective and which do not insulate their respective connectors properly. In other instances the sheaths may become damaged during subsequent handling. Rather than scrap these connectors it is common practice to strip the defective sheaths from the metal shells and then resheath the shells, discarding only the sheath material.

In the past, various processes have been utilized for the removal of the defective sheaths from the metal shells. For example, in one prior known arrangement the sheathed electrical connectors are passed through an oven by means of a continuous conveyor, to cause splitting and curling of the sheaths. Subsequently, the conveyor transports the connectors through a stripping mechanism for removing the sheath material from the metal shells. This system is undesirable, however, because the connectors frequently become jammed in the stripping mechanism, making it necessary to stop the conveyor. Further, as a result some of the connectors may remain in the oven for extended periods, causing overheating and annealing of the metal inserts whereby their prongs lose their hardness and are ineffective for piercing insulation when the connector is subsequently used in establishing an electrical connection between two insulated wires.

In another known prior art arrangement, each defective sheath is slit transversely at one end and a plurality of the sheathed connectors are placed in an oven for a predetermined time period, such as one-half hour, to cause the sheaths to split and to curl off of the connectors. The connectors then are placed in a vibrator to separate the sheath material from the connectors. This arrangement is undesirable, however, since it has been found to be ineffective with certain types of plastic sheathing material.

SUMMARY OF THE INVENTION

An object of this invention is to provide a new and improved method of and apparatus for stripping heat shrinkable material which extends peripherally about a relatively rigid article, from the article.

In accordance with the invention, in stripping heat shrinkable material which extends peripherally about a relatively rigid article, from the article, the material first is scored for a substantial distance with respect to one dimension thereof. The scored article then is positioned in a nest defined by peripheral surface portions of a pair of juxtaposed stripping rollers and subjected to heat to cause the material on the article to shrink and to separate along the scored portion of the article. The material and the article then are separated by rotating the rollers so as to strip the material from the article and to discharge the material from the nest through the rollers, after which the stripped article is removed from the nest.

BRIEF DESCRIPTION OF THE DRAWINGS

FIG. 1 is a plan view of apparatus in accordance with the invention;

FIG. 2 is an elevational view of the apparatus shown in FIG. 1;

FIG. 3 is an enlarged cross-sectional view taken along the line 3—3 of FIG. 2 and showing the apparatus in a first operating position;

FIG. 4 is a cross-sectional view similar to FIG. 3 and showing the apparatus in a second operating position;

FIG. 5 is a cross-sectional view similar to FIGS. 3 and 4 and showing the apparatus in a third operating position;

FIG. 6 is another cross-sectional view of the apparatus in its second operating position, taken along the line 6—6 of FIG. 1;

FIG. 7 is an enlarged cross-sectional view of a portion of the apparatus taken along the line 7—7 of FIG. 2; and FIG. 8 is an isometric view, partially in cross section, showing a sheathed electrical connector which may be stripped of its electrical insulating sheath by the method and apparatus of this invention.

DETAILED DESCRIPTION

Referring to FIG. 8, it is seen that the invention is disclosed as applied to the stripping of defective heat shrinkable plastic insulation 11 from an elongated metal shell 12 of an electrical connector 13. The electrical connector 13 also includes a metal insert 14 fixedly secured within the shell 12 and provided with inwardly directed prongs 14a. The insulation 11 is in the form of a sleeve which is heat shrunk onto the shell 12 to form a protective sheath, with the ends of the sleeve projecting beyond the ends of the shell so that the shell is substantially encased in the sleeve. The sheathed connector 13 is adapted to be telescoped over the ends of a pair of insulated wires (not shown), after which it is compressed by a special tool to cause the prongs 14a of the metal insert 14 to pierce the insulation on the wires and to establish an electrical connection between the wires.

In general, referring to FIGS. 1 and 2, the disclosed apparatus includes a mechanism 16 for feeding the defective sheathed connectors 13 longitudinally through a scoring mechanism 17 for scoring each of the plastic sheaths 11 along its length. From the scoring mechanism 17 the sheathed connectors 13 feed into a device 18 for receiving a plurality of the connectors and subsequently transferring them into a sheath stripping device 19. After a plurality of the scored connectors 13 have been deposited in the sheath stripping device 19 they are subjected to heat by a heating unit 21 to cause the sheaths 11 to shrink and separate along the scored portions of the sheaths. The stripping device 19 then is operated to strip and separate the sheaths 11 from the connector shells 12.

More specifically, the feeding mechanism 16 includes a vibratory feeder 22 of a conventional type, which is bolted to a horizontal support table 23 and which is actuated by a control switch 16S to feed the connectors 13 in single file into a guideway 24. The guideway 24 is fixedly secured to a vertically disposed plate member 26 and is open along its top so that feeding of the connectors 13 therethrough can be assisted by air jets 27 and so as to provide ready access to the connectors in the guideway in the event they become jammed therein. The vertical plate member 26 is welded or otherwise fixedly secured at one end to the vibratory feeder 22 and is fixedly connected adjacent its other end to an upstanding bracket on the support table 23.

As is best shown in FIGS. 2 and 7, the scoring mechanism 17 includes a pressure wheel 28 of a resilient material, such as rubber, and an opposed scoring wheel 29 having a peripheral cutting edge. The scoring wheel 29 is mounted for free rotation on the vertical plate member 26 and extends upward through a slot in the guideway 24 into the path of the connectors 13. The pressure wheel 28, however, is power driven so as to advance the connectors 13 through it and the scoring wheel 29, and is keyed to a shaft 31 connected by a gear and chain drive 32 to an electric motor 33 suitably supported on the vertical plate member 26.

To insure scoring of the sheath 11 of each connector 13 along its entire length, the pressure wheel 28 is movably mounted and spring biased toward the scoring wheel 29 in a suitable manner. For example, in the illustrated embodiment of the invention the drive shaft 31 for the pressure wheel 28 is journalled in a member 34 mounted for sliding movement toward and away from the scoring wheel 29 on guide pins 36 (FIG. 7) force fitted into the vertical plate member 26 and projecting therefrom into elongated slots in the slide member 34. The slide member 34 is biased toward the scoring wheel 29 by a coil spring 37 (FIG. 7) connected between the slide member and a projecting dowel pin on the vertical support plate 26, and the gear and chain drive 32 includes a suitable spring-biased slack takeup roller 38 (FIG. 2). Thus, as each of the sheathed connectors 13 passes between the pressure wheel 28 and the scoring wheel 29 the plastic sheath 11 of the connector is scored or scribed along its entire length by the scoring wheel. In this connection, the biasing force exerted by the coil spring 37 should be such that the pressure wheel 28 will not collapse the shell 12 and the insert 14 of the connector 13, and preferably is such that the scoring wheel 29 does not cut completely through the sheath 11 so as to deface the shell.

As is best shown in FIGS. 1 and 3, the transfer device 18 includes an elongated rotatable magazine 39 journalled in an elongated barrel member 41. The magazine 39 is provided with a peripheral connector receiving slot 39a which extends the entire length thereof except for a portion at its left-hand end as viewed in FIG. 1, which portion functions as a stop for the scored connectors 13 as they are fed into the slot from the guideway 24.

The barrel 41, which is substantially open along its top for viewing of the scored connectors 13 in the magazine slot 39a and for providing access to the connectors in case they become jammed therein, also is provided with an elongated discharge slot 41a (FIGS. 3 and 4) which is substantially coextensive with the magazine slot 39a, for the discharge of the connectors 13 from the magazine 39 in a manner to be described. The barrel 41 is welded or otherwise fixedly secured to the upper ends of a pair of horizontally spaced support arms 42 which are secured to an elongated shaft 43 journalled adjacent its opposite ends in upstanding brackets 44 on the support table 23. The transfer device 18 is pivotable about the axis of the shaft 43 between a connector receiving position as shown in FIG. 3 and a connector discharge position as shown in FIG. 4, by an air cylinder 46 connected between an extension of one of the support arms 42 and an upstanding support wall 47 on the horizontal support table 23.

When the magazine 39 of the transfer device 18 has become filled with scored connectors 13 from the guideway 24, the switch button 16S is released to turn off the vibratory feeder 22 and the pressure wheel drive motor 33. The air cylinder 46 is then energized by means of a suitable dual button safety switch 18S (FIGS. 1 and 2) in which the operator is required to use both hands to actuate the circuit, to pivot the transfer device 18 counterclockwise from its connector receiving position in FIG. 3 to its connector discharge position in FIG. 4. During the initial movement of the transfer device 18, a stop assembly 48 (FIGS. 1 and 4), which is slidably mounted on the guideway 24 and held in an inoperative position by a projecting lug 41b (FIG. 1) on the barrel 41 when the transfer device is in its connector receiving position, is advanced by a coil spring 49 (FIG. 4) against the leading connector 13 in the guideway to preclude advancement of the connectors therein. Subsequently, as the transfer device 18 approaches its discharge position the magazine 39 is rotated in the barrel 41 so as to discharge the connectors 13 in the magazine slot 39a through the barrel discharge slot 41a and into a nest 51 defined by adjacent surface portions of a pair of juxtaposed stripping rollers 52 of the sheath stripping device 19. Movement of the transfer device 18 into its connector discharge position in FIG. 4 is limited by surface portions of the barrel lug 41b engaging upper surface portions of the stripping rollers 52, as shown in that figure.

Referring to FIGS. 1 and 6, it is seen that in the illustrated embodiment of the invention rotation of the magazine 39 in the barrel 41 for a connector discharge operation is accomplished by a mechanism including a rotatable cam follower 53 mounted on a lever member 54 which is secured to a shaft extension on one end of the magazine. When the transfer device 18 is in its connector receiving position as shown in dashed lines in FIG. 6, the cam follower 53 is seated in a slot 44a in the adjacent bracket 44 to retain the magazine 39 in proper position. As the transfer device 18 approaches its connector discharge position as shown in solid lines in FIG. 6, the cam follower 53 engages a suitable camming surface of an adjustably mounted cam block 56. As the transfer device 18 continues to pivot, the cam follower 53 rides down the camming surface of the cam block 56 until it comes into engagement with a portion 52a of one of the stripping rollers 52, which portion is undercut for a purpose to be described. Thus, as the transfer device 18 pivots into its discharge position, the cam follower 53, through its support lever 54, causes the magazine 39 to rotate in the barrel 41 so that the connectors 13 in the magazine slot 39a drop through the barrel discharge slot 41a into the nest 51 defined by the stripping rollers 52. When the transfer device 18 is returned to its article receiving position, the magazine 39 is rotated back to its original position by the cam follower 53 engaging a portion 44b of the adjacent bracket 44.

As is best shown in FIGS. 3 and 5, the heating unit 21 includes an elongated housing 57 in which a reflector 58 and a radiant heat lamp 59 are mounted in a suitable manner. The housing 57 is secured to a pair of support arms 61 which project therefrom and which are pivoted on the vertical support wall 47. Thus, the heating unit 21 is capable of pivotal movement between an upper position as shown in FIG. 3 and a lower position over the stripping rollers 52 as shown in FIG. 5, in which it heats the scored connectors 13 in the nest 51 to cause the sheaths 11 to shrink and separate along the scored portions thereof. The heating unit 21 is pivoted between its two positions by an air cylinder 62 connected between one of the support arms 61 and the vertical support wall 47.

Referring to FIGS. 1 and 3, during initial warmup of the apparatus and during its subsequent operation, whether or not the temperature in the nest 51 is sufficient (such as 300° to 400° F) to insure proper heating of the sheaths 11 is determined by a temperature sensing device 63 of a suitable type mounted on the horizontal support table 23 and including a sensing element 63a (FIG. 3) engaged with one of the stripping rollers 52, the sensing device being connected to a suitable indicator (not shown). Further, overheating of the heating unit 21 is prevented by continuously introducing relatively cool pressurized air into opposite sides of the housing 57 through air lines 66 (FIG. 1) adjacent one end thereof, thereby continuously purging the interior of the housing of hot air through vents 67 (FIGS. 3 and 5) adjacent its other end. Similarly, when the heating unit 21 is moved into its heating position shown in FIG. 5, a solenoid controlled valve 68 is energized to permit relatively cool pressurized air to be directed against the radiant heat lamp 59 through an air line 69, a longitudinally extending passageway 57a within the housing 57 and a longitudinally extending slot 58a in the heat reflector 58. In addition to cooling the radiant heat lamp 59, this air causes fumes which may be generated by the heating of the sheaths 11 and which could tarnish the heat reflector 58, to be purged from beneath the reflector and to the exterior of the housing 57.

The stripping rollers 52 of the stripping device 19 are journalled adjacent their opposite ends in support members 71 a right hand one of which, as viewed in FIG. 1, is in the form of a gear housing mounted on the vertical support wall 47, and a left hand one of which, as viewed in FIG. 1, is in the form of an upstanding plate member secured to the horizontal support table 23. Referring to FIGS. 1 and 6, the upstanding plate member 71 also serves as a support for the cam block 56, the cam block being adjustably mounted on the plate member for horizontal movement by means of suitable screws extending through slots in the cam block. Further, as is best shown in FIG. 1, to facilitate the stripping of the sheaths 11 from the metal shells 12, the rollers 52 are provided with narrow spiral grooves 52b.

During a stripping operation the rollers 52 are rotated so that their upper peripheral surface portions adjacent the nest 51 move toward one another as indicated by the arrows in FIG. 5, to strip the heated sheaths 11 from the metal shells 12 and to discharge the sheath material between the rollers and into a suitable receptacle 72. In this connection, the spacing between the rollers 52 is such that the stripped material 11 can pass downward between the rollers from the nest 51, but such that the shells 12 cannot pass between the rollers and therefore will remain in the nest. As the rollers 52 rotate, the stripped sheath material 11 is cleaned therefrom by scraping bars 73 mounted at their opposite ends on the support members 71. In the illustrated embodiment of the invention, the rotation of the rollers 52 is accomplished by an electric motor 74 (FIG. 1) which is connected to one of the rollers through a speed reducer 76 and a gear and chain drive 77, the first roller in turn driving the second roller by means of a pair of meshing gears 78 mounted on the rollers in the gear housing type support member 71.

Referring to FIGS. 1 and 6, it is seen that the portions 52a of the stripping rollers 52 are undercut to provide a discharge opening therebetween. Thus, the stripped shells 12 can be pushed longitudinally in the nest 51 with a suitable tool after the stripping operation has been completed, and drop through the space between the undercut portions 52a and through a guide tube into a suitable container 79.

When the transfer device 18 reaches its connector discharge position in FIG. 4, a projecting arm 81, which is fixedly mounted on one of the support arms 42, actuates a limit switch 82 on the support table 23 to cause reversal of the air cylinder 46 and the return of the transfer device to its article receiving position in FIG. 3. As the transfer device 18 reaches its article receiving position, a second projecting arm 83, which is clamped to the pivot shaft 43, actuates a second limit switch 84 on the support table 23 to energize the air cylinder 62, which then pivots the heating unit 21 into its position over the nest 51 as shown in FIG. 5. As the heating unit 21 reaches its heating position one of its support arms 61 operates a limit switch 86 on the vertical support wall 47 to turn on the radiant heat lamp 59, to actuate the cooling air control valve 68 and to start a timer 87 (FIGS. 1 and 2) mounted on the front of the support wall. After a predetermined heating interval, which has been determined to be sufficient to cause shrinkage and splitting of the sheaths 11 along their scored portions (such as 10 seconds), the timer 87 causes energization of the drive motor 74 for the stripping rollers 52 and starts a second timer 88 (FIGS. 1 and 2) on the front of the support wall 47. After a second predetermined time interval, which has been determined to be sufficient to strip the sheaths 11 from the metal shells 12 (such as 10 seconds), the second timer 88 actuates suitable circuitry to turn off the heat lamp 59, to deactuate the cooling air control valve 68, to deenergize the stripping roller drive motor 74 and to cause reversal of the air cylinder 62, which then moves the heating unit 21 back to its original position.

SUMMARY

Summarizing, with the apparatus in its position as shown in FIGS. 1, 2 and 3 the switch button 16S is depressed to energize the vibratory feeder 22 of the feed mechanism 16 and the drive motor 33 of the scoring mechanism 17. The vibratory feeder 22 then feeds the sheathed connectors 13 into the guideway 24, while the drive motor 33, through the gear and chain drive 32, rotates the shaft 31 to drive the pressure wheel 28 mounted thereon. The connectors 13 travel along the guideway 24 and through the scoring mechanism 17 into the transfer device 18, with their passage through the guideway being assisted by the air jets 27 and with each connector being positively advanced through the scoring mechanism by the power driven pressure wheel 28. As each of the connectors 13 passes through the scoring mechanism 17, since the pressure wheel 28 is being continuously urged toward the scoring wheel 29 as a result of its being mounted on the spring biased slide member 34, the scoring wheel scores the sheath 11 of the connector along its entire length.

When the magazine slot 39a of the transfer device 18 has become filled with the scored connectors 13 the switch 16S is released to deenergize the vibratory feeder 22 and the pressure wheel drive motor 33. Then, assuming that the temperature in the nest 51, as determined by the temperature sensing device 63, is sufficient to insure proper heating of the sheaths 11, the dual button switch 18S is operated to actuate the air cylinder 46 (FIG. 3), which pivots the transfer device 18 counterclockwise in FIG. 3 into its connector discharge position over the nest 51 of the stripping device 19, as shown in FIG. 4. As the transfer device 18 begins this pivotal movement the lug 41b on its barrel 41 disengages from the slidably mounted stop assembly 48 and permits the spring 49 to move the stop assembly into engagement with the leading connector 13 in the guideway 24, to preclude advancement of the connectors in the guideway.

Referring to FIG. 6, as the transfer device 18 approaches its connector discharge position as shown in solid lines in this figure, the cam follower 53 carried by the magazine 39 engages the camming surface of the cam block 56. As the transfer device 18 continues to pivot the cam follower 53 rides down the camming surface of the cam block 56 and, through its supporting lever 54, causes counterclockwise rotation (as viewed in FIG. 6) of the magazine 39 in the barrel 41. Subsequently, downward movement of the cam follower 53 is limited by its coming into engagement with the undercut portion 52a of the adjacent sheath stripping roller 52. Thus, as the transfer device moves into its discharge position the magazine 39 is rotated in the barrel 41 to discharge the connectors 13 in the magazine slot 39a into the nest 51 defined by the stripping rollers 52.

Referring to FIG. 4, as the transfer device 18 reaches its connector discharge position, its actuating arm 81 operates the limit switch 82 to cause reversal of the air cylinder 46 whereby the transfer device is pivoted back to its connector receiving position in FIG. 3. Referring to FIG. 6, as the transfer device 18 approaches its article receiving position the cam follower 53 on the magazine 39 engages the portion 44b of the adjacent bracket 44 to cause rotation of the magazine back into its original position in the barrel 41. Subsequently, the cam follower 53 rides into the bracket slot 44a to lock the magazine 39 in its original position in the barrel 41 whereby the magazine slot 39a again is aligned with the guideway 24 for the reception of connectors 13 therefrom. The switch 16S now may be actuated to feed a new set of the sheathed connectors 13 into the magazine slot 39a, as above described.

As the transfer device 18 reaches its connector receiving position in FIG. 3, its actuating arm 83 operates the limit switch 84 to cause energization of the air cylinder 62, which then pivots the heating unit 21 clockwise in FIG. 3 into its position over the nest 51 as shown in FIG. 5. As the heating unit 21 reaches its heating position in FIG. 5 one of its support arms 61 operates the limit switch 86 to turn on the radiant heat lamp 59, to actuate its associated cooling air control valve 68 and to start the timer 87 (FIG. 1). The scored connectors 13 in the nest 51 then are subjected to radiant heat from the heating unit 21 to cause the sheaths 11 of the connectors to shrink and separate along the scored portions thereof.

Overheating of the heating unit 21 during the heating of the connectors 13 in the nest 51 is precluded by the relatively cool air which is being continuously introduced into the interior of the housing 57 through the air lines 66 adjacent the housing's right hand end, as viewed in FIG. 1, and which causes hot air to be purged continuously from the housing through the vents 67 (FIGS. 3 and 5) adjacent its opposite end. Similarly, the radiant heat lamp 59 is cooled and fumes which are generated as a result of the heating of the plastic sheaths 11 are purged from beneath the heat reflector 58, by air through the valve 68, air line 69, housing passageway 57a and reflector slot 58a.

When the timer 87 times out, it causes energization of the stripping device drive motor 74 and causes energization of the second timer 88 (FIG. 1). The drive motor 74, through the speed reducer 76, the gear and chain drive 77 and the meshing gears 78 on the spirally grooved stripping rollers 52, then causes the stripping rollers to rotate in opposite directions as indicated by the arrows in FIG. 5. The rotating rollers 52 then strip the sheaths 11 from the metal shells 12, with the stripped material passing through the rollers into the receptacle 72, and with any sheath material which adheres to the rollers being scraped therefrom by the scraping bars 73. The metal shells 12, however, being too large to pass between the rollers 52, remain in the nest 51. Subsequently, the second timer 88 times out to turn off the radiant heat lamp 59, to deactuate the cooling air control valve 68, to cause reversal of the air cylinder 62, which returns the heating unit 21 to its position shown in FIG. 3, and to cause deenergization of the stripping device drive motor 74.

The metal shells 12 in the nest 51 next are pushed by a suitable hand tool along the nest to the left in FIGS. 1 and 2, to the discharge opening provided by the undercut portions 52a of the stripping rollers 52, where they drop into the receptacle 79 (FIG. 6). The switch 18S then is operated to cause the transfer device 18 to deposit the new set of the connectors 13 which have been fed into the magazine 39, in the nest 51, whereupon the above described heating and sheath stripping operations are repeated.

What is claimed is:

1. The method of stripping heat shrinkable material which extends peripherally about a relatively rigid article, from the article, which comprises:
    scoring the heat shrinkable material for a substantial distance with respect to one dimension thereof;
    positioning the scored article in a nest defined by peripheral surface portions of a pair of juxtaposed stripping rollers;
    heating the scored heat shrinkable material after the article has been positioned in the nest so as to cause the material to shrink and to separate along the scored portion of the material;
    separating the material and the article by rotating the stripping rollers so that peripheral surface portions of the rollers adjacent the nest move toward one another to strip the heated material from the article and to discharge the material from the nest through the rollers; and
    removing the stripped article from the nest.

2. The method as recited in claim 1, in which the article is relatively elongated and in which:
    the heat shrinkable material is scored lengthwise of the article as the article is being fed longitudinally.

3. Apparatus for stripping heat shrinkable material which extends peripherally about an elongated relatively rigid article, from the article, which comprises:
    means for feeding the elongated article longitudinally;
    means for scoring the heat shrinkable material lengthwise of the article as the article is being fed longitudinally;
    a pair of juxtaposed stripping rollers having peripheral surface portions which define a nest for receiving the scored article, the spacing between said rollers being such that heat shrinkable material which is stripped from the article can pass therethrough, but such that the article cannot pass therethrough;
    means for feeding the scored article from said scoring means to the nest defined by said stripping rollers;
    radiant heat means for heating the scored heat shrinkable material after the article has been fed to the nest defined by said stripping rollers, such that the material shrinks and separates along the scored portion of the material; and
    means for rotating the stripping rollers so that peripheral surface portions of the rollers adjacent the nest move toward one another to strip the heated material from the article and to discharge the material from the nest through the rollers, thereby separating the material and the article.

4. Apparatus as recited in claim 3, in which:
    said scoring means includes a rotatable support wheel and an opposed scoring wheel having a peripheral cutting edge.

5. Apparatus as recited in claim 3, which further comprises:
    a rotatable magazine member having a peripheral longitudinally extending slot for receiving a plurality of the scored articles therein from said scoring means;
    means for moving said magazine member from an article receiving position to an article discharge position over the nest defined by said stripping rollers; and
    means for rotating said magazine member to effect discharge of the scored articles from the slot in said magazine member into the nest defined by said stripping rollers.

6. Apparatus for stripping heat shrinkable material which extends peripherally about a relatively rigid article, from the article, which comprises:
    means for scoring the heat shrinkable material on the article for a substantial distance with respect to one dimension of the material;
    juxtaposed rotatable stripping means having peripheral surface portions which define a nest for receiving and supporting the scored article;
    means for positioning the scored article in the nest defined by said juxtaposed rotatable stripping means;
    means for heating the scored heat shrinkable material after the article has been positioned in the nest defined by said juxtaposed rotatable stripping means, such that the material shrinks and separates along the scored portion of the material; and
    means for rotating said juxtaposed rotatable stripping means so that peripheral surface portions of said rotatable stripping means adjacent the nest move toward one another to strip the heated material from the article and to discharge the material from the nest through said rotatable stripping means, thereby separating the material and the article.

* * * * *